US012760604B2

(12) United States Patent
Vestita

(10) Patent No.: US 12,760,604 B2
(45) Date of Patent: Oct. 13, 2026

(54) SPLICE CONNECTION SYSTEM FOR ELECTRO SUBMERSIBLE PUMP CABLES IN OIL WELLS AND METHOD OF ASSEMBLY

(71) Applicant: Giovanni Antonio Vestita, Austin, TX (US)

(72) Inventor: Giovanni Antonio Vestita, Austin, TX (US)

(73) Assignee: Giovanni Vestita, Austin, TX (US)

( * ) Notice: Subject to any disclaimer, the term of this patent is extended or adjusted under 35 U.S.C. 154(b) by 0 days.

(21) Appl. No.: 18/921,020

(22) Filed: Oct. 21, 2024

(65) Prior Publication Data

US 2026/0071503 A1 Mar. 12, 2026

Related U.S. Application Data

(60) Provisional application No. 63/691,703, filed on Sep. 6, 2024.

(51) Int. Cl.

| | |
|---|---|
| ***E21B 17/02*** | (2006.01) |
| ***E21B 43/12*** | (2006.01) |
| ***H01R 4/70*** | (2006.01) |
| ***H02G 15/24*** | (2006.01) |

(52) U.S. Cl.

CPC .......... *E21B 17/028* (2013.01); *E21B 43/128* (2013.01); *H01R 4/70* (2013.01); *H02G 15/24* (2013.01)

(58) Field of Classification Search

CPC ....... E21B 17/028; E21B 43/128; H01R 4/70; H02G 15/24

See application file for complete search history.

(56) References Cited

U.S. PATENT DOCUMENTS 1,944,251 A * 1/1934 Mansbendel .......... D07B 7/167 29/505
3,816,641 A * 6/1974 Iversen ................ H01R 13/523 174/76
4,408,092 A * 10/1983 Eatwell .................. H02G 15/10 174/91
5,670,747 A * 9/1997 Lawer .................. H01R 13/523 174/77 R
5,762,135 A * 6/1998 Moore ................ E21B 33/0407 174/76

(Continued)

*Primary Examiner* — Neel Girish Patel

(57) ABSTRACT

The present invention relates to a splice connection system for securely connecting electro submersible pump cables that transmit power from an external source to downhole equipment in an underground well for oil extraction applications, thereby ensuring enhanced durability, reliability, and ease of assembly in harsh well environments. The splice connection system comprises a pair of ESP cables and a spliced enclosure. The spliced enclosure comprises seal bands, sealing rings, seal members, splice connectors, a protective case, a potting insulation compound, an epoxy sealant and reinforced housing. The splice connection system significantly reduces installation time and complexity compared to traditional methods by providing a secure, efficient, and resilient splicing approach, thereby improving overall reliability of ESP systems. The splice connection system simplifies the splicing process, minimizes waste, and enhances performance and longevity of ESP cable connections.

14 Claims, 5 Drawing Sheets

(56) References Cited

U.S. PATENT DOCUMENTS

| | | | | |
|---|---|---|---|---|
| 6,545,221 | B1 * | 4/2003 | Halpert | H02G 15/10<br>166/65.1 |
| 6,716,063 | B1 * | 4/2004 | Bryant | H01R 13/5208<br>439/589 |
| 7,405,358 | B2 * | 7/2008 | Emerson | H01R 13/5216<br>174/88 R |
| 7,544,105 | B2 * | 6/2009 | Stagi | H01R 11/09<br>439/805 |
| 7,980,873 | B2 * | 7/2011 | Emerson | E21B 43/128<br>439/191 |
| 10,808,486 | B2 * | 10/2020 | Angers, Jr. | E21B 33/047 |
| 10,837,252 | B2 * | 11/2020 | Angers, Jr. | E21B 33/0407 |
| 2003/0084716 | A1 * | 5/2003 | Patey | E21B 47/017<br>73/152.02 |
| 2008/0026623 | A1 * | 1/2008 | Emerson | E21B 43/128<br>439/275 |
| 2008/0087466 | A1 * | 4/2008 | Emerson | H02G 15/18<br>174/88 R |
| 2008/0230232 | A1 * | 9/2008 | Farrara | E21B 33/0407<br>166/65.1 |
| 2010/0065302 | A1 * | 3/2010 | Nesbitt | E21B 17/0285<br>174/116 |
| 2012/0097444 | A1 * | 4/2012 | Hilberts | H01R 43/005<br>174/77 R |
| 2014/0110164 | A1 * | 4/2014 | Emerson | E21B 33/0407<br>174/667 |
| 2020/0256168 | A1 * | 8/2020 | Knight | E21B 43/117 |
| 2021/0257818 | A1 * | 8/2021 | Jarvis | H02G 1/14 |

* cited by examiner

SPLICE CONNECTION SYSTEM FOR ELECTRO SUBMERSIBLE PUMP CABLES IN OIL WELLS AND METHOD OF ASSEMBLY

FIELD OF THE INVENTION

The present disclosure relates generally to electrical systems used in oil wells, and more particularly to a splice connection system for securely connecting electro submersible pump (ESP) cables that transmit power from an external source to downhole equipment in an underground well for oil extraction applications, thereby ensuring enhanced durability, reliability, and ease of assembly in harsh well environments.

BACKGROUND

The oil and gas industry is heavily reliant on various artificial lift systems to facilitate the extraction of hydrocarbons from wells. Among these systems, electro submersible pumps (ESPs) are widely utilized due to their efficiency and effectiveness in lifting fluids from significant depths. These pumps are particularly advantageous in wells where natural pressure is insufficient to bring the fluids to the surface, thereby enabling the extraction of valuable resources from deep geological formations. The ability to deploy ESPs effectively is critical for optimizing production and maximizing resource recovery in the industry.

However, the operational environment of oil wells presents unique challenges, including high pressures, extreme temperatures, and exposure to corrosive fluids. These factors can severely compromise the integrity of the electrical components involved in ESP operations, particularly the cables that connect the pumps to surface equipment. These cables must endure harsh conditions, including mechanical stresses and chemical exposure, which can lead to degradation over time. Therefore, ensuring the reliability of these cables is paramount for maintaining uninterrupted pump operation and ensuring efficient hydrocarbon recovery.

Traditional methods for splicing ESP cables have remained largely unchanged for over four decades. These methods typically involve labor-intensive procedures requiring a substantial array of tools and materials, resulting in lengthy installation times and increased labor costs. Moreover, the splicing process often mandates skilled technicians to execute properly, which can limit operational efficiency, particularly in remote or challenging environments where such expertise may not be readily available. This reliance on skilled labor not only contributes to higher costs but also extends the timeframe for installation and maintenance.

Current splicing techniques involve numerous steps and components, including tape, crimp connectors, and various sealants. This complexity not only heightens the likelihood of human error but also introduces multiple potential failure points. Improper sealing or insulation can lead to critical issues such as electrical failures, fluid ingress, and ultimately diminished pump performance. In extreme cases, these failures may necessitate costly repairs or complete replacement of the ESP system, resulting in prolonged downtime and substantial financial losses. The cumulative impact of these challenges underscores the urgent need for a more robust solution.

By addressing all the above mentioned limitations, there is a need for a splice connection system for securely connecting electro submersible pump (ESP) cables that transmit power from an external source to downhole equipment in an underground well for oil extraction applications, thereby ensuring enhanced durability, reliability, and ease of assembly in harsh environments. There is also a need for a splice connection system that significantly reduces installation time and complexity compared to traditional methods by providing a secure, efficient, and resilient splicing approach, thereby ultimately improving the overall reliability of ESP systems. Furthermore, there is also a need for a splice connection system that simplifies the splicing process, minimizes waste, and enhances the performance and longevity of ESP cable connections.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a splice connection system for securely connecting electro submersible pump (ESP) cables that transmit power from an external source to downhole equipment in an underground well for oil extraction applications, thereby ensuring enhanced durability, reliability, and ease of assembly in harsh environments. The splice connection system significantly reduces installation time and complexity compared to traditional methods by providing a secure, efficient, and resilient splicing approach, thereby ultimately improving the overall reliability of ESP systems. The splice connection system simplifies the splicing process, minimizes waste, and enhances the performance and longevity of ESP cable connections. In one embodiment herein, the splice connection system comprises a reinforced housing, one or more seal members, a plurality of splice connectors, and a protective case.

In one embodiment herein, the reinforced housing having a first section and a second section. The first section and the second section are configured with openings for receiving terminal ends of a first ESP cable and a second ESP cable, respectively. The first section and the second section are slidably positioned on the first ESP cable and the second ESP cable at a distance from the respective terminal ends.

In one embodiment herein, the splice connection system comprises sealing rings that are positioned over the seal bands to provide a waterproof seal, thereby preventing fluids from entering the spliced connection. In one embodiment herein, the splice connection system comprises seal bands that are encircled around the first ESP cable and the second ESP cable to provide additional support and protection, thereby preventing fraying of the first ESP cable and the second ESP cable.

In one embodiment herein, the one or more seal members having plurality of holes configured to receive stripped conductor wires of the first ESP cable and the second ESP cable, respectively, to ensure a secure and insulated connection.

In one embodiment herein, the plurality of splice connectors is configured to electrically connect the stripped conductor wires of the first ESP cable and the second ESP cable, respectively, thereby creating a spliced connection that allows transmission of electrical power and control signals between the first ESP cable and the second ESP cable. The plurality of splice connectors is adapted to receive and secure respective end portions of the stripped conductor wires of the first ESP cable and the second ESP cable from both sides.

In one embodiment herein, the one or more splice connectors are made of a high-conductivity material such as copper, thereby ensuring efficient electrical transmission and minimizing energy losses. The one or more splice connectors are varied in sizes along their length based on the type and gauge of the conductor wires of the first ESP cable and the second ESP cable, thereby ensuring a secure and efficient connection for different cable configurations.

In one embodiment herein, the one or more splice connectors are securely clamped and held together using a gran jaw upon securing the respective end portions of the stripped conductor wires of the first ESP cable and the second ESP cable, thereby preventing separation of the one or more splice connectors during operation.

In one embodiment herein, the one or more splice connectors are coated with red isolant air dry using an air drying unit upon securely clamping the one or more splice connectors, thereby providing an additional layer of insulation and protection against moisture and corrosion.

In one embodiment herein, the protective case having an upper section and a lower section, which is secured to the upper section to enclose the spliced connection. The upper section and the lower section comprise a plurality of slots for respectively receiving the plurality of splice connectors to secure the spliced connection.

In one embodiment herein, the splice connection system further comprises a potting insulation compound that is injected into a plurality of primary holes on the protective case using a potting injector, thereby expelling air through multiple exhaust holes on the protective case. The splice connection system further comprises an epoxy sealant that is injected into a plurality of secondary holes on the protective case using an epoxy injector, thereby expelling air through the multiple exhaust holes on the protective case.

In one embodiment herein, the protective case is concealed by sliding and connecting the first section and the second section of the reinforced housing upon enclosing the spliced connection by the protective case, thereby forming an additional layer that enhances protection against mechanical stress, environmental factors, and potential impact. The epoxy sealant is applied to edges of the first section and the second section of the reinforced housing to create a secure connection that encloses the protective case over the spliced connection.

According to an aspect, a method is disclosed for splicing the electro submersible pump (ESP) cables using the splice connection system. First, at one step, the first section and the second section of the reinforced housing are slidably positioned over the terminal ends of the first ESP cable and the second ESP cable, followed by the insertion of the sealing rings to ensure a secure fit. At another step, the one or more protective layers are stripped and removed from the terminal ends of the first ESP cable and the second ESP cable to expose the conductor wires for splicing. At another step, the seal bands are encircled around the terminal ends of the first ESP cable and the second ESP cable, followed by positioning the one or more seal members over the stripped conductor wires of the first ESP cable and the second ESP cable, respectively.

At another step, the stripped conductor wires of the first ESP cable and the second ESP cable are joined using the one or more splice connectors to form the spliced connection, followed by securely clamping the one or more splice connectors and applying red isolant air dry to provide additional insulation and protection. At another step, the lower section of the protective case is attached to the upper section for securely enclosing the spliced connection.

At another step, the potting insulation compound is injected into the plurality of primary holes and the epoxy sealant into the plurality of secondary holes on the protective case, respectively, thereby ensuring the expulsion of air through multiple exhaust holes on the protective case. Further, at another step, the epoxy sealant is applied to the edges of the first section and the second section of the reinforced housing, followed by sliding and connecting the first section and the second section to encase the protective case, thereby preventing fluid ingress into the spliced connection.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
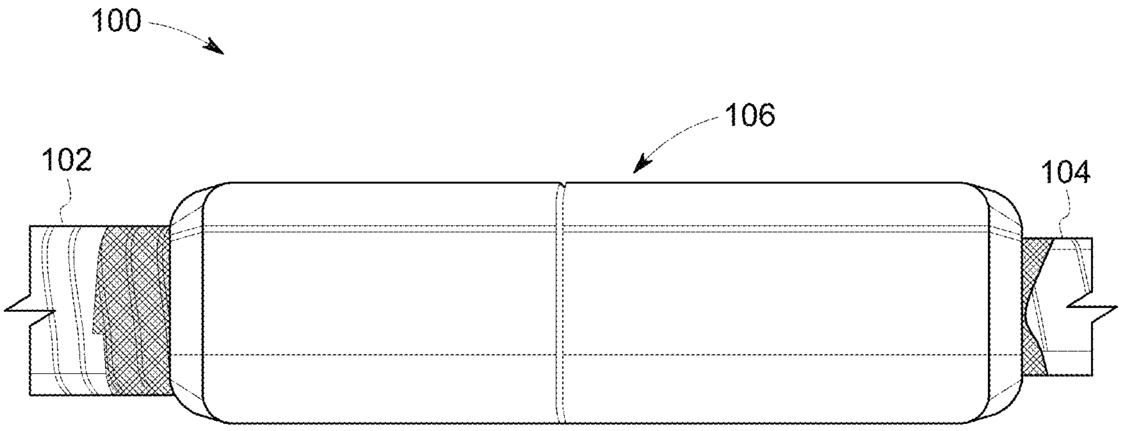
FIG. 1 illustrates a perspective view of a splice connection system, in accordance with an exemplary embodiment to the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a perspective view of a splice connection system 100. In one embodiment herein, the splice connection system 100 is designed for securely connecting electro submersible pump (ESP) cables that transmit power from an external source to downhole equipment in an underground well for oil extraction applications, thereby ensuring enhanced durability, reliability, and ease of assembly in harsh environments. The splice connection system 100 significantly reduces installation time and complexity compared to traditional methods by providing a secure, efficient, and resilient splicing approach, thereby ultimately improving the overall reliability of ESP systems. The splice connection system 100 simplifies the splicing process, minimizes waste, and enhances the performance and longevity of ESP cable connections. In one embodiment herein, the splice connection system 100 comprises a pair of ESP cables (102, 104), and a spliced enclosure 106.

In one embodiment herein, the electro submersible pump (ESP) cables (102, 104) comprise a first ESP cable 102 that is configured with a larger diameter, intended to handle higher electrical loads. The first ESP cable 102 can provide enhanced performance in demanding applications, thereby ensuring efficient power transmission to downhole equipment. In one embodiment herein, the ESP cables (102, 104) also comprise a second ESP cable 104 with a smaller diameter, which makes it suitable for less demanding tasks. The smaller size of the second ESP cable 104 may allow greater flexibility during installation and simplify routing in tight spaces, while still maintaining the necessary conductivity and performance standards required for effective operation in oil well environments.

Figure 2:
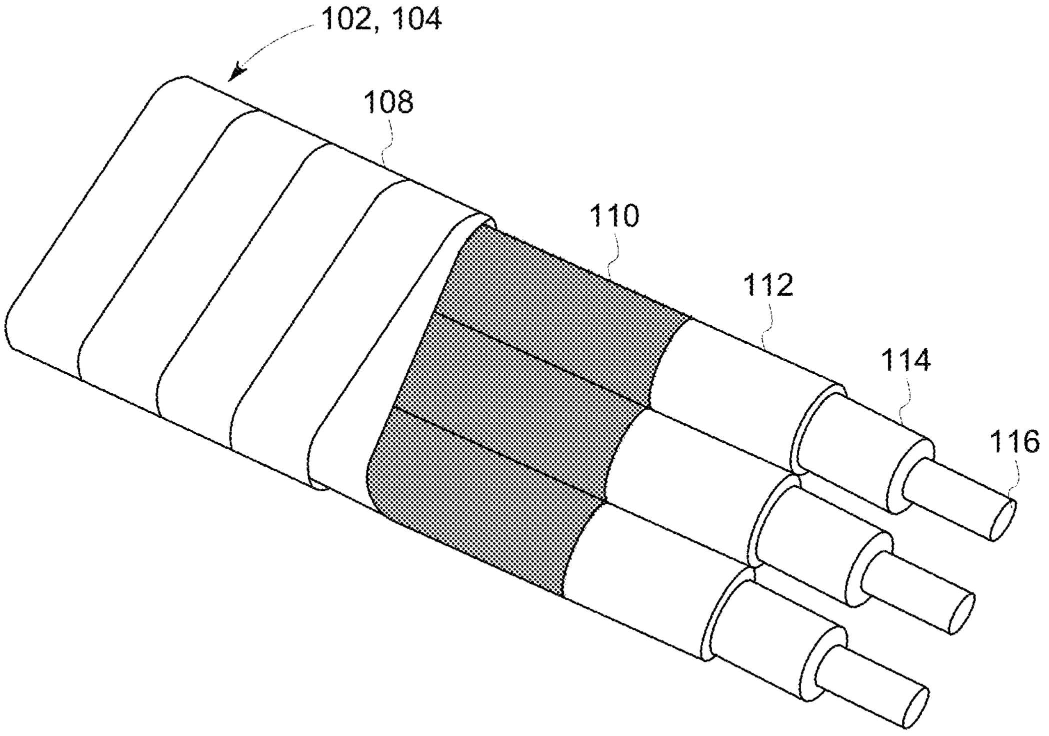
FIG. 2 illustrates a lateral view of a first ESP cable and a second ESP cable of the pair of ESP cables of the splice connection system, in accordance with an exemplary embodiment to the invention.

FIG. 2 refers to a lateral view of the first ESP cable 102 and the second ESP cable 104 of the pair of ESP cables (102, 104). In one embodiment herein, the first ESP cable 102 and the second ESP cable 104 comprise multiple protective layers (108, 110, 112, 114) that provide enhanced durability and resilience against the harsh conditions typically encountered in oil wells. The outermost layer is an armored layer 108, which offers substantial mechanical strength and protection against external abrasions, impacts, and physical stress that may arise during installation and operation. Beneath this armored layer 108 is a polyester layer 110, which functions as an effective moisture barrier, preventing the infiltration of water and other contaminants. The polyester layer 110 can maintain the performance and longevity of the ESP cables (102, 104) in wet environments.

In one embodiment herein, a lead layer 112 is located under the polyester layer 110 and serves as a shield against electromagnetic interference (EMI). In one embodiment herein, an insulation layer 114 is positioned beneath the lead layer 112 and surrounds conductor wires 116. The primary function of the insulation layer 114 is to electrically insulate the conductor wires 116, thereby ensuring that the transmission of power and control signals is both efficient and safe. These multiple protective layers (108, 110, 112, 114) are cut and stripped to expose the conductor wires 116 for a spliced connection between the first ESP cable 102 and the second ESP cable 104, thereby ensuring a secure and efficient connection that meets operational requirements.

Figure 3:
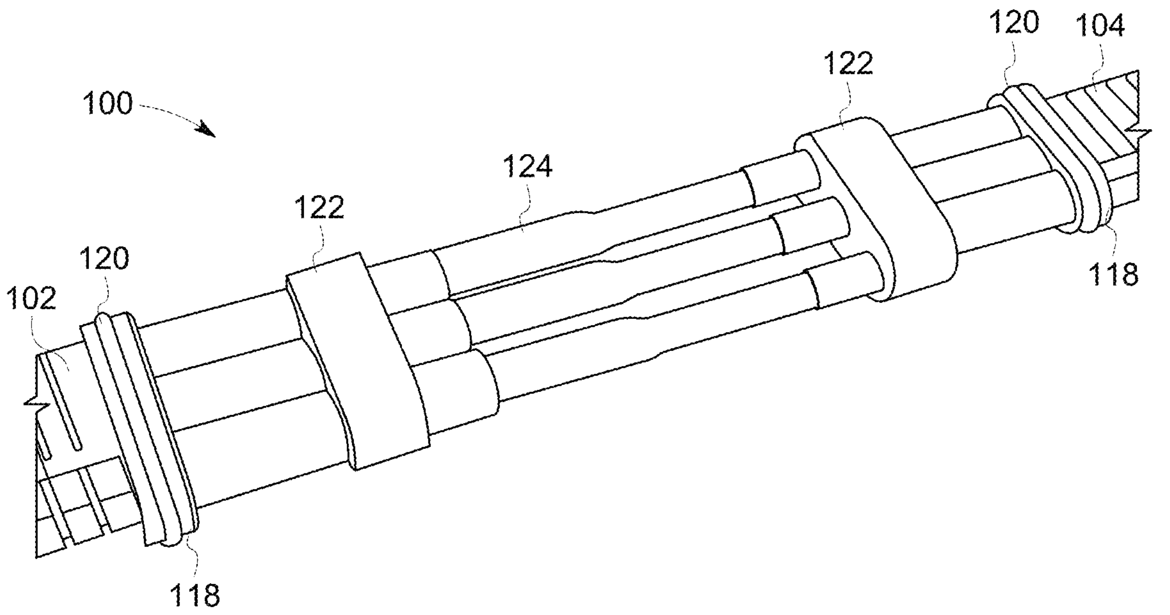
FIG. 3 illustrates a perspective view of a spliced connection between the first ESP cable and the second ESP cable, in accordance with an exemplary embodiment to the invention.

FIG. 3 refers to a perspective view of the spliced connection between the first ESP cable 102 and the second ESP cable 104. In one embodiment herein, the spliced enclosure 106 also comprises seal bands 118 that are encircled around the first ESP cable 102 and the second ESP cable 104 to enhance structural integrity and longevity. The seal bands 118 may reinforce the physical structure of the first ESP cable 102 and the second ESP cable 104, and also mitigate the risk of fraying, which can occur due to mechanical stress and environmental factors present in the oil well. In one embodiment herein, the spliced enclosure 106 also comprises sealing rings 120 that are positioned over the seal bands 118 to establish a waterproof seal around the first ESP cable 102 and the second ESP cable 104, thereby protecting them from moisture and other potentially damaging fluids that may be encountered in underground environments.

In one embodiment herein, the spliced enclosure 106 also comprises one or more seal members 122 having plurality of holes that are configured to receive the conducting wires 116 of the first ESP cable 102 and the second ESP cable 104. The seal members 122 may facilitate secure connections while preventing any unwanted ingress of fluids or contaminants, thus ensuring that the electrical integrity of the connection remains intact even in the most challenging conditions.

In one embodiment herein, the spliced enclosure 106 also comprises one or more splice connectors 124 that are configured to receive the conductor wires 116 of the first ESP cable 102 and the second ESP cable 104. The splice connectors 124 can electrically connect the conductor wires 116 of the first ESP cable 102 and the second ESP cable 104, thereby forming the spliced connection that enables efficient transmission of electrical power and control signals between the first ESP cable 102 and the second ESP cable 104. The use of high-conductivity materials in the splice connectors 124 ensures minimal energy losses, thereby allowing for real-time communication and power delivery essential for effective oil extraction. The design of the splice connectors 124 ensures that they accommodate the varying dimensions of the conductor wires 116, thus providing a secure and reliable connection.

Figure 4:
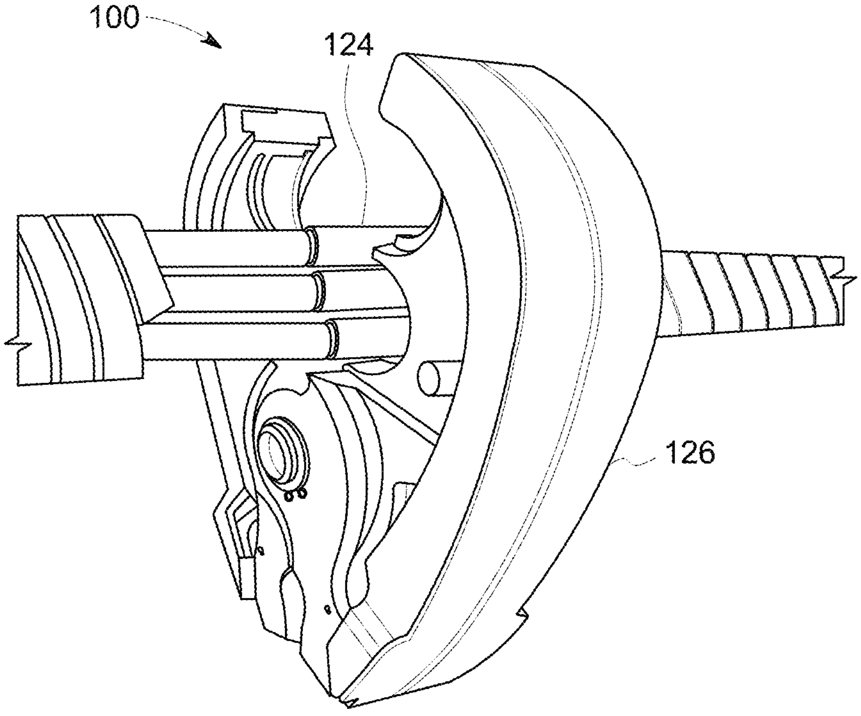
FIG. 4 illustrates a perspective view of the spliced connection using a pair of splice connectors, in accordance with an exemplary embodiment to the invention.

FIG. 4 refers to a perspective view of the spliced connection using the splice connectors 124. In one embodiment herein, the splice connectors 124 are securely clamped together using a gran jaw 126 to enhance stability of the spliced connection, thereby preventing separation of the splice connectors 124 during operation and ensuring consistent electrical connectivity. Furthermore, the splice connectors 124 are coated with a red isolant air dry material using an air drying unit, thereby providing an additional layer of insulation that protects against moisture intrusion and corrosion. This coating may enhance the durability of the splice connectors 124 and contribute to the overall reliability of the connection, thereby ensuring that the splice connection system 100 can function effectively in the harsh and often corrosive environments found in oil wells.

In one embodiment herein, the splice connectors 124 are made of high-conductivity materials such as copper, which can minimize energy losses and ensure efficient electrical transmission. The use of high-quality materials contributes to the overall performance of the splice connection system 100, as it allows for optimal power delivery to downhole equipment. Additionally, the splice connectors 124 are designed in varying sizes along their length, tailored to match the specific type and gauge of the conductor wires 116 used in the first ESP cable 102 and the second ESP cable 104. This customization ensures that each connection is secured and also optimized for different cable configurations, thereby enhancing the versatility and adaptability of the splice connection system 100.

Figure 5:
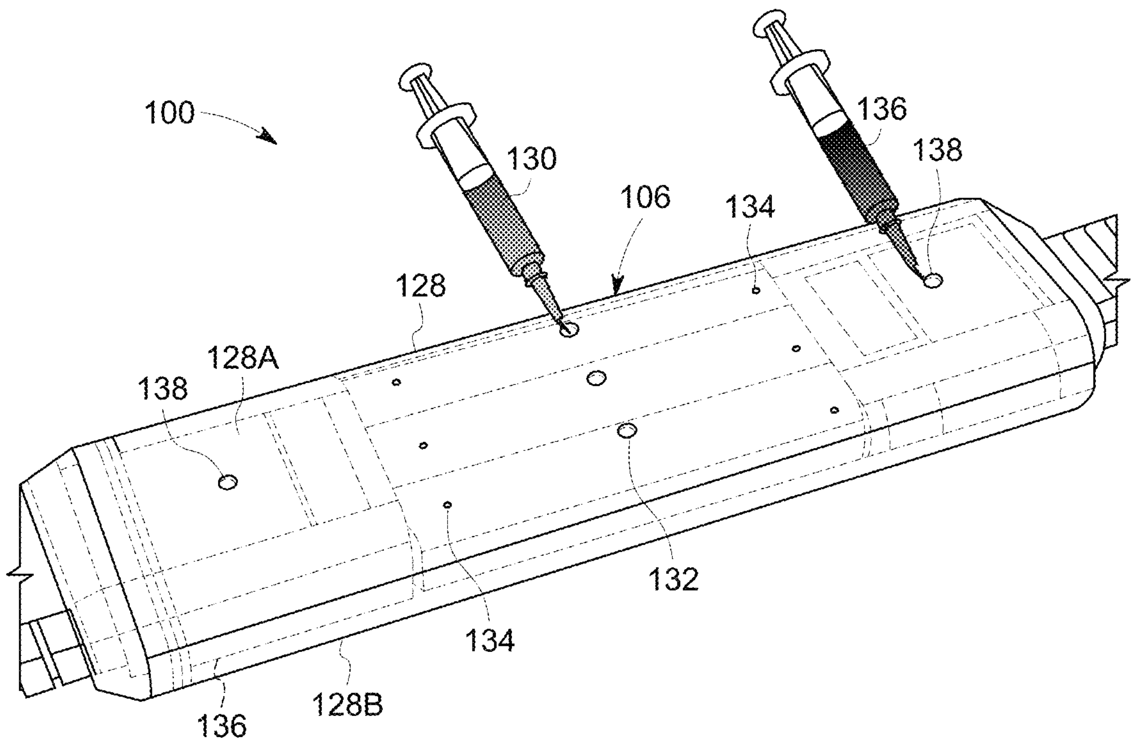
FIG. 5 illustrates a perspective view of a spliced enclosure of the splice connection system, in accordance with an exemplary embodiment to the invention.

FIG. 5 refers to a perspective view of the spliced enclosure 106 of the splice connection system 100. In one embodiment herein, the spliced enclosure 106 comprises a protective case 128, which consists of an upper section 128A that is positioned above the splice connectors 124 and a lower section 128B located below the splice connectors 124.

This dual-section design is configured to connect and completely enclose the spliced connection, thereby providing a robust waterproof seal that protects the electrical components from external elements. The protective case 128 can maintain the integrity of the spliced connection in oil wells, where exposure to harsh environmental conditions is a constant challenge. By safeguarding the spliced connection, the protective case 128 contributes significantly to the durability and reliability of the splice connection system 100.

In one embodiment herein, the spliced enclosure 106 comprises a potting insulation compound 130 that is injected into a plurality of primary holes 132 on the protective case 128 using a potting injector to enhance the protective capabilities of the spliced enclosure 106. The potting insulation compound 130 can effectively fill any voids within the spliced enclosure 106, thereby expelling air through multiple exhaust holes 134, and creating a solid barrier against moisture and contaminants. In one embodiment herein, the spliced enclosure 106 comprises an epoxy sealant 136 that is injected into a plurality of secondary holes 138 on the protective case 128 using an epoxy injector, which may similarly serve to displace air through the exhaust holes 134 and establish a robust seal, thereby ensuring that the spliced connection is well-protected against fluid ingress.

Figure 6:
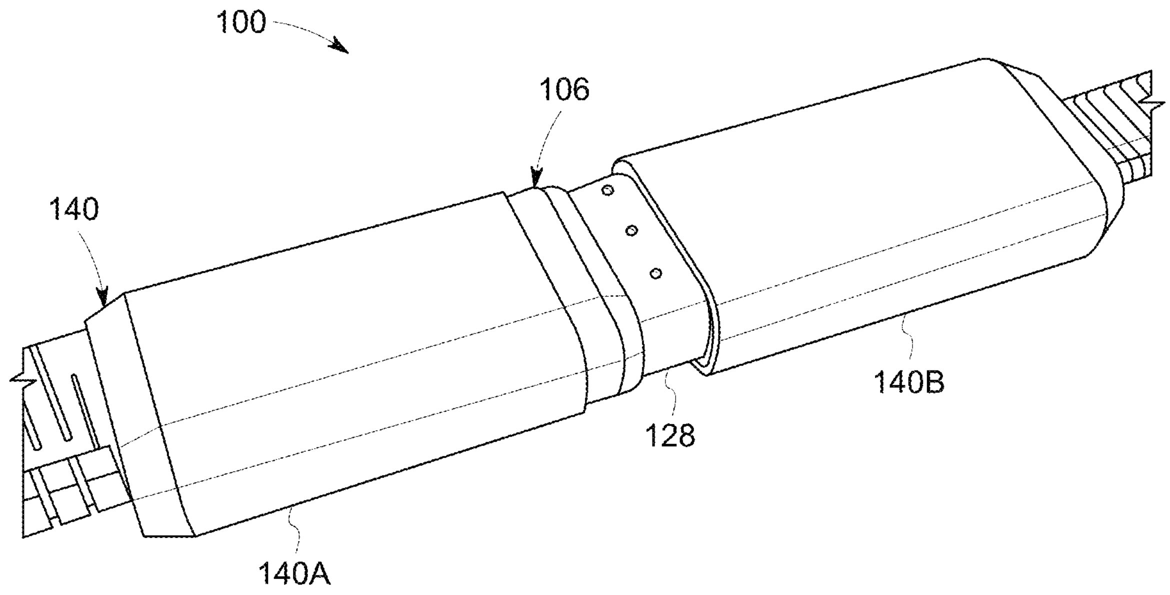
FIG. 6 illustrates an isometric view of the splice connection system, in accordance with an exemplary embodiment to the invention.

FIG. 6 refers to an isometric view of the splice connection system 100. In one embodiment herein, the spliced enclosure 106 further comprises a reinforced housing 140 having a first section 140A and a second section 140B that are securely connected to each other, thereby effectively encasing the protective case 128 over the spliced connection. The reinforced housing 140 can maintain the position of the protective case 128 and prevent any potential fluid ingress into the spliced connection. The epoxy sealant 136 is also applied to edges of the first section 140A and the second section 140B of the reinforced housing 140, thereby creating a secure connection that enhances the overall stability of the spliced enclosure 106. The design and assembly of the spliced enclosure 106 can ensure that the first ESP cable 102 and the second ESP cable 104 are well-protected and capable of withstanding the demanding conditions encountered in oil well applications.

Figure 7:
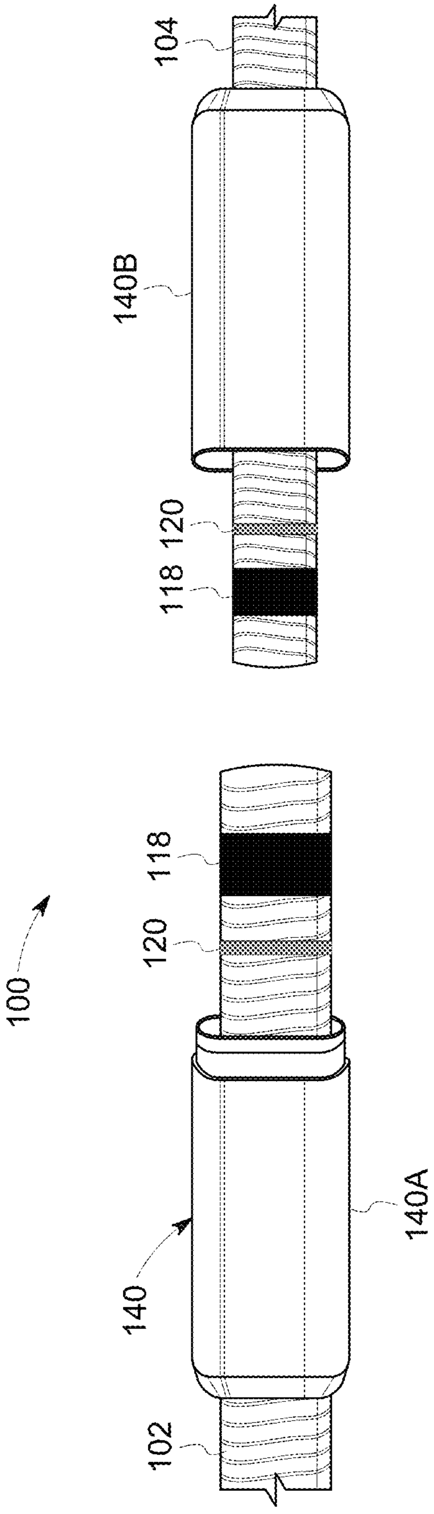
FIG. 7 illustrates a perspective view of the first ESP cable and the second ESP cable of the splice connection system, in accordance with an exemplary embodiment to the invention.

FIG. 7 refers to a perspective view of the first ESP cable 102 and the second ESP cable 104 of the splice connection system 100. In one embodiment herein, a step-by-step assembly process is disclosed for the spliced enclosure 106 of the splice connection system 100. In one embodiment herein, the assembly process begins with the preparation of the first ESP cable 102 and the second ESP cable 104. First, the first section 140A and the second section 140B of the reinforced housing 140 are configured with openings to receive terminal ends of the first ESP cable 102 and the second ESP cable 104, respectively. The reinforced housing 140 can provide structural support and protection to the spliced connection, thereby ensuring that it can withstand the harsh conditions encountered in oil wells. Following this, the sealing rings 120 are positioned over the first ESP cable 102 and the second ESP cable 104. These sealing rings 120 may enhance the waterproof properties of the spliced enclosure 106.

Once the reinforced housing 140 and the sealing rings 120 are in place, the terminal ends of the first ESP cable 102 and the second ESP cable 104 are stripped and removed the multiple protective layers (108, 110, 112, 114), such as the armored layer 108, the polyester layer 110, the lead layer 112 and the insulation layer 114, thereby exposing the conductor wires 116 from the terminal ends of the first ESP cable 102 and the second ESP cable 104 as shown in FIG. 2. This step ensures that the conductor wires 116 are ready for spliced connection. Later, the seal bands 118 are encircled around the ends of the first ESP cable 102 and the second ESP cable 104. This additional layer of support prevents fraying of the first ESP cable 102 and the second ESP cable 104 from potential damage during installation and operation. Following this, the one or more seal members 122 are positioned over the stripped conductor wires 116 of the first ESP cable 102 and the second ESP cable 104, respectively.

Later, the conductor wires 116 of the first ESP cable 102 and the second ESP cable 104 are inserted into the splice connectors 124, which are configured to electrically connect the conductor wires 116 of the first ESP cable 102 and the second ESP cable 104, thereby forming the spliced connection that facilitates the transmission of electrical power and control signals from the first ESP cable 102 to the second ESP cable 104 as shown in FIG. 3. Later, the splice connectors 124 are clamped securely using the gran jaw 126 to maintain stable electrical connection as shown in FIG. 4. This clamping action ensures that the splice connectors 124 remain tightly held together during operation, thereby preventing any accidental separation or disconnection.

Referring to FIG. 5, the next step involves placing the protective case 128 over the spliced connection. The upper section 128A and the lower section 128B of the protective case 128 are attached together to enclose the spliced connection, thereby providing a waterproof seal, and safeguarding the internal components from moisture and contaminants that may be present in the well environment. Later, the potting insulation compound 130 is injected into the primary holes 132 of the protective case 128 to enhance the insulation and protection of the spliced connection. The potting insulation compound 130 may fill any voids within the spliced enclosure 106, thereby providing additional moisture resistance. As the potting insulation compound 130 is injected, the air within the protective case 128 is expelled through the exhaust holes 134 to ensure complete filling and eliminate air pockets.

Following the potting insulation compound 130, the epoxy sealant 136 is injected into the secondary holes 138 on the protective case 128. The epoxy sealant 136 can reinforce the waterproof characteristics of the spliced enclosure 106 and create a robust seal that protects against moisture intrusion. The air within the protective case 128 is expelled through the exhaust holes 134 during the injection process. After the protective case 128 is filled with the potting insulation compound 130 and the epoxy sealant 136, the first section 140A and the second section 140B of the reinforced housing 140 are securely connected to each other as shown in FIG. 1 and FIG. 6. The epoxy sealant 136 is applied to the edges of the first section 140A and the second section 140B of the reinforced housing 140 to ensure a tight seal around the protective case 128, thereby holding the protective case 128 securely in position and preventing fluid ingress into the spliced connection.

Figure 8:
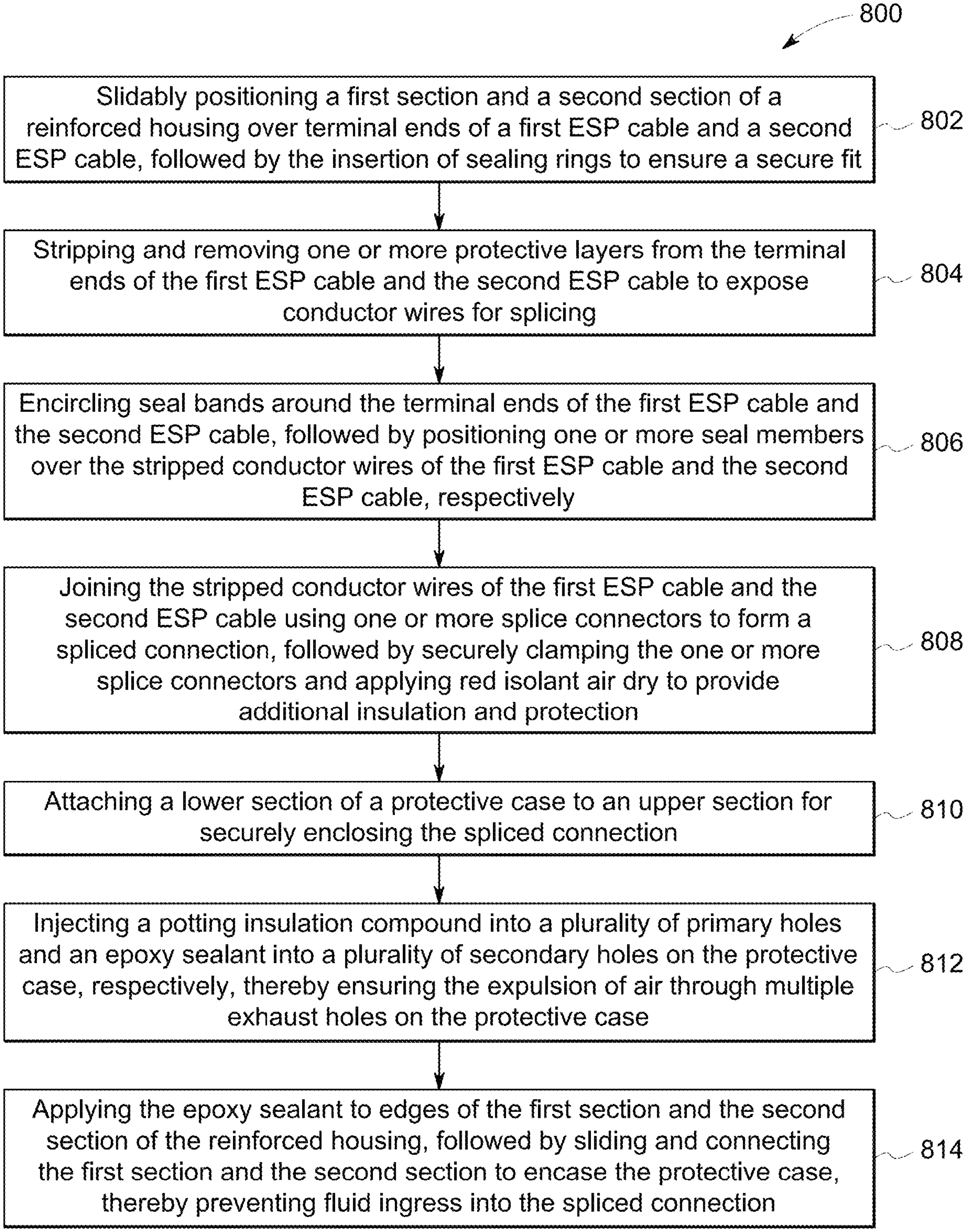
FIG. 8 refers to a flowchart of a method for splicing electro submersible pump (ESP) cables in oil wells, in accordance with an exemplary embodiment to the invention.

FIG. 8 refers to a flowchart 800 of a method for splicing electro submersible pump (ESP) cables using the splice connection system 100. First, at step 802, the first section 140A and the second section 140B of the reinforced housing 140 are slidably positioned over the terminal ends of the first ESP cable 102 and the second ESP cable 104, followed by the insertion of the sealing rings 120 to ensure a secure fit. At step 804, the one or more protective layers (108, 110, 112, 114) are stripped and removed from the terminal ends of the first ESP cable 102 and the second ESP cable 104 to expose the conductor wires 116 for splicing. At step 806, the seal bands 118 are encircled around the terminal ends of the first ESP cable 102 and the second ESP cable 104, followed by positioning one or more seal members 122 over the stripped conductor wires 116 of the first ESP cable 102 and the second ESP cable 104, respectively.

At step 808, the stripped conductor wires 116 of the first ESP cable 102 and the second ESP cable 104 are joined using the one or more splice connectors 124 to form the spliced connection, followed by securely clamping the one or more splice connectors 124 and applying red isolant air dry to provide additional insulation and protection. At step 810, the lower section 128B of the protective case 128 is attached to the upper section 128A for securely enclosing the spliced connection.

At step 812, the potting insulation compound 130 is injected into the plurality of primary holes 132 and the epoxy sealant 136 into the plurality of secondary holes 138 on the protective case 128, respectively, thereby ensuring the expulsion of air through multiple exhaust holes 134 on the protective case 128. Further, at step 814, the epoxy sealant 136 is applied to the edges of the first section 140A and the second section 140B of the reinforced housing 140, followed by sliding and connecting the first section 140A and the second section 140B to encase the protective case 128, thereby preventing fluid ingress into the spliced connection.

The splice connection system 100 for electro submersible pump (ESP) cables offers several critical advantages, particularly in enhancing the durability and reliability of power transmission in harsh oil well environments. The addition of sealing components such as seal bands 118, sealing rings 120, and splice connectors 124 further fortifies the splice connection system 100 against water ingress, thereby ensuring a secure and waterproof seal around the spliced connection. These protective measures collectively enhance the overall performance and stability of the first ESP cable 102 and the second ESP cable 104, even under extreme conditions. The splice connection system 100 provides ease of assembly and adaptability, which is crucial in oil extraction operations where cable configurations may vary.

Moreover, the splice connectors 124 allow for seamless integration of cables of different sizes, thereby accommodating various well conditions and downhole equipment requirements. This flexibility reduces the complexity of installation while ensuring efficient power transmission to the equipment located at the well's bottom. Additionally, the use of materials such as high-conductivity copper in the splice connectors 124 minimizes energy loss, thereby improving operational efficiency. The incorporation of the protective case 128 and reinforced housing 140 adds an extra layer of mechanical and environmental protection, thereby making the splice connection system 100 highly resilient against fluid ingress and corrosion. Overall, the splice connection system 100 not only improves the reliability of ESP cable connections but also simplifies the installation process, thereby ensuring a more effective and long-lasting solution for oil well operations.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A splice connection system for electrical submersible pump (ESP) cables, comprising:

a reinforced housing having a first section and a second section, wherein the first section and the second section are configured with openings for receiving terminal ends of a first ESP cable and of a second ESP cable, respectively, wherein the first section and the second section are slidably positioned on the first ESP cable and on the second ESP cable at a distance from the respective terminal ends;

a pair of seal members configured to receive stripped conductor wires of the first ESP cable and of the second ESP cable, respectively, thereby ensuring a secure and insulated connection;

a plurality of splice connectors configured to electrically connect the stripped conductor wires of the first ESP cable and of the second ESP cable, respectively, thereby creating a spliced connection that allows transmission of electrical power and control signals between the first ESP cable and the second ESP cable;

a protective case having an upper section and a lower section, wherein the lower section is secured to the upper section to enclose the spliced connection, wherein the upper section and the lower section are configured to respectively receive the plurality of splice connectors to secure the spliced connection, and wherein the protective case is entirely concealed by sliding and connecting the first section and the second section of the reinforced housing upon enclosing the spliced connection by the protective case, thereby forming an additional layer that enhances protection against mechanical stress, environmental factors, and potential impact;

seal bands that are encircled around the first ESP cable and the second ESP cable to provide additional support and protection, thereby preventing fraying of the first ESP cable and of the second ESP cable; and sealing rings that are positioned over the seal bands to provide a waterproof seal, thereby preventing fluids from entering the spliced connection.

2. The splice connection system for electro submersible pump (ESP) cables of claim 1, wherein the plurality of splice connectors is adapted to receive and secure respective end portions of the stripped conductor wires of the first ESP cable and the second ESP cable from both sides.

3. The splice connection system for electro submersible pump (ESP) cables of claim 1, wherein the splice connection system further comprises a potting insulation compound that is injected into a plurality of primary holes on the protective case using a potting injector, thereby expelling air through multiple exhaust holes on the protective case.

4. The splice connection system for electro submersible pump (ESP) cables of claim 1, wherein the splice connection system further comprises an epoxy sealant that is injected into a plurality of secondary holes on the protective case using an epoxy injector, thereby expelling air through the multiple exhaust holes on the protective case.

5. The splice connection system for electro submersible pump (ESP) cables of claim 4, wherein the epoxy sealant is applied to edges of the first section and the second section of the reinforced housing to create a secure connection that encloses the protective case over the spliced connection.

6. The splice connection system for electro submersible pump (ESP) cables of claim 1, wherein the one or more splice connectors are securely clamped and held together using a jaw tool upon securing the respective end portions of the stripped conductor wires of the first ESP cable and the second ESP cable, thereby preventing separation of the one or more splice connectors during operation.

7. The splice connection system for electro submersible pump (ESP) cables of claim 1, wherein the one or more splice connectors are coated with red isolant air dry using an air drying unit upon securely clamping the one or more splice connectors, thereby providing an additional layer of insulation and protection against moisture and corrosion.

8. The splice connection system for electro submersible pump (ESP) cables of claim 1, wherein the one or more splice connectors are made of a high-conductivity material such as copper, thereby ensuring efficient electrical transmission and minimizing energy losses.

9. The splice connection system for electro submersible pump (ESP) cables of claim 1, wherein the one or more splice connectors are varied in sizes along their length based on the type and gauge of the conductor wires of the first ESP cable and the second ESP cable, thereby ensuring a secure and efficient connection for different cable configurations.

10. A splice connection system for electrical submersible pump (ESP) cables, comprising:

a reinforced housing having a first section and a second section, wherein the first section and the second section are configured with openings for receiving terminal ends of a first ESP cable and of a second ESP cable, respectively;

wherein the first section and the second section are slidably positioned on the first ESP cable and on the second ESP cable at a distance from the respective terminal ends;

a pair of seal members configured to receive stripped conductor wires of the first ESP cable and of the second ESP cable, respectively, thereby ensuring a secure and insulated connection;

a plurality of splice connectors configured to electrically connect the stripped conductor wires of the first ESP cable and of the second ESP cable, respectively, thereby creating a spliced connection that allows transmission of electrical power and control signals between the first ESP cable and the second ESP cable;

a protective case having an upper section and a lower section, wherein the lower section is secured to the upper section to enclose the spliced connection, wherein the upper section and the lower section are configured to respectively receive the plurality of splice connectors to secure the spliced connection;

a potting insulation compound disposed within a plurality of primary holes on the protective case, thereby filling an internal cavity of the protective case to provide enhanced insulation and protection for the spliced connection;

an epoxy sealant disposed within a plurality of secondary holes on the protective case, thereby ensuring a robust seal that enhances moisture resistance and protects the spliced connection, wherein the epoxy sealant is applied to edges of the first section and of the second section of the reinforced housing to create a secure connection that encloses the protective case over the spliced connection, thereby forming an additional layer that enhances protection against mechanical stress, environmental factors, and potential impact;

wherein the protective case is entirely concealed by sliding and connecting the first section and the second section of the reinforced housing upon enclosing the spliced connection by the protective case;

seal bands that are encircled around the first ESP cable and the second ESP cable to provide additional support and protection, thereby preventing fraying of the first ESP cable and the second ESP cable; and sealing rings that are positioned over the seal bands to provide a waterproof seal, thereby preventing fluids from entering the spliced connection.

11. The splice connection system for electro submersible pump (ESP) cables of claim 10, wherein the one or more splice connectors are securely clamped and held together using a jaw tool upon securing the respective end portions of the stripped conductor wires of the first ESP cable and the second ESP cable, thereby preventing separation of the one or more splice connectors during operation.

12. The splice connection system for electro submersible pump (ESP) cables of claim 10, wherein the one or more splice connectors are coated with red isolant air dry using an air drying unit upon securely clamping the one or more splice connectors, thereby providing an additional layer of insulation and protection against moisture and corrosion.

13. The splice connection system for electrical submersible pump (ESP) cables of claim 10, wherein the one or more splice connectors are made of a high-conductivity material such as copper, thereby ensuring efficient electrical transmission and minimizing energy losses.

14. The splice connection system for electrical submersible pump (ESP) cables of claim 10, wherein the one or more splice connectors are varied in sizes along their length based on the type and gauge of the conductor wires of the first ESP cable and the second ESP cable, thereby ensuring a secure and efficient connection for different cable configurations.

* * * * *